Feb. 28, 1950 F. RAFFLES 2,499,343

PHONOGRAPH TONE ARM

Filed May 23, 1947

INVENTOR
FRANK RAFFLES
BY Morris Spector
ATTORNEY

Patented Feb. 28, 1950 2,499,343

UNITED STATES PATENT OFFICE 2,499,343

PHONOGRAPH TONE ARM

Frank Raffles, Chicago, Ill.

Application May 23, 1947, Serial No. 750,071

7 Claims. (Cl. 274—23)

This invention relates to phonograph tone arms.

In the operation of a phonograph wherein a needle rides in a groove of a disc record certain noises are necessarily introduced by reason of the needle pressing against the record. It has been recognized that the objectionable noises are reduced as the pressure between the needle and the record is reduced.

It is one of the objects of the present invention to provide a phonograph tone arm which supports a phonograph sound pick-up device in the usual manner and wherein the phonograph tone arm is so counterbalanced as to reduce to a minimum the pressure between the needle of the pick-up device and the rotating disc record. In accordance with the principles of the present invention the phonograph tone arm is swivelled at one end to swing about a fixed axis and carries at its opposite end a sound pick-up or sound reproducer and which includes a needle that rides on the phonograph record. The tone arm is provided with a counterbalancing spring which is so arranged as not only to relieve the record of all of the weight of the tone arm, but also to relieve it of most of the weight of the sound pick-up at the end of the tone arm. In the preferred construction the counterbalancing arrangement is such that it can be made to reduce the needle pressure on the disc as much as desired, even down to zero pressure, if that should be desired.

In phonograph reproducers the tone arm must be turnable under the action of the needle riding in the phonograph groove as the needle approaches closer and closer to the center of the phonograph disc. It is one of the objects of the present invention to provide a counterbalancing spring for the tone arm, which spring will offer a minimum amount of resistance to the turning of the tone arm under the action of the needle.

It is a still a further object of the present invention to provide an adjusting spring of the above mentioned character which will permit the tone arm to swing vertically limited amounts, as may be necessary due to the fact that the record is not perfectly level, and which will not substantially change the pressure of the needle on the record as the tone arm moves up and down during the rotation of the record disc.

It is a still further object of the present invention to provide a counterbalancing spring arrangement wherein the means for mounting the spring on the tone arm serves also to secure the tone arm to its mounting escutcheon or the like.

The attainment of the above and further objects of the present invention will be apparent from the following specification taken in conjunction with accompanying drawing forming a part thereof.

In the drawing.

Reference may now be had more particularly to the drawing wherein like reference numerals designate like parts throughout.

Figures 1, 2, 3, 4, 5, 6:
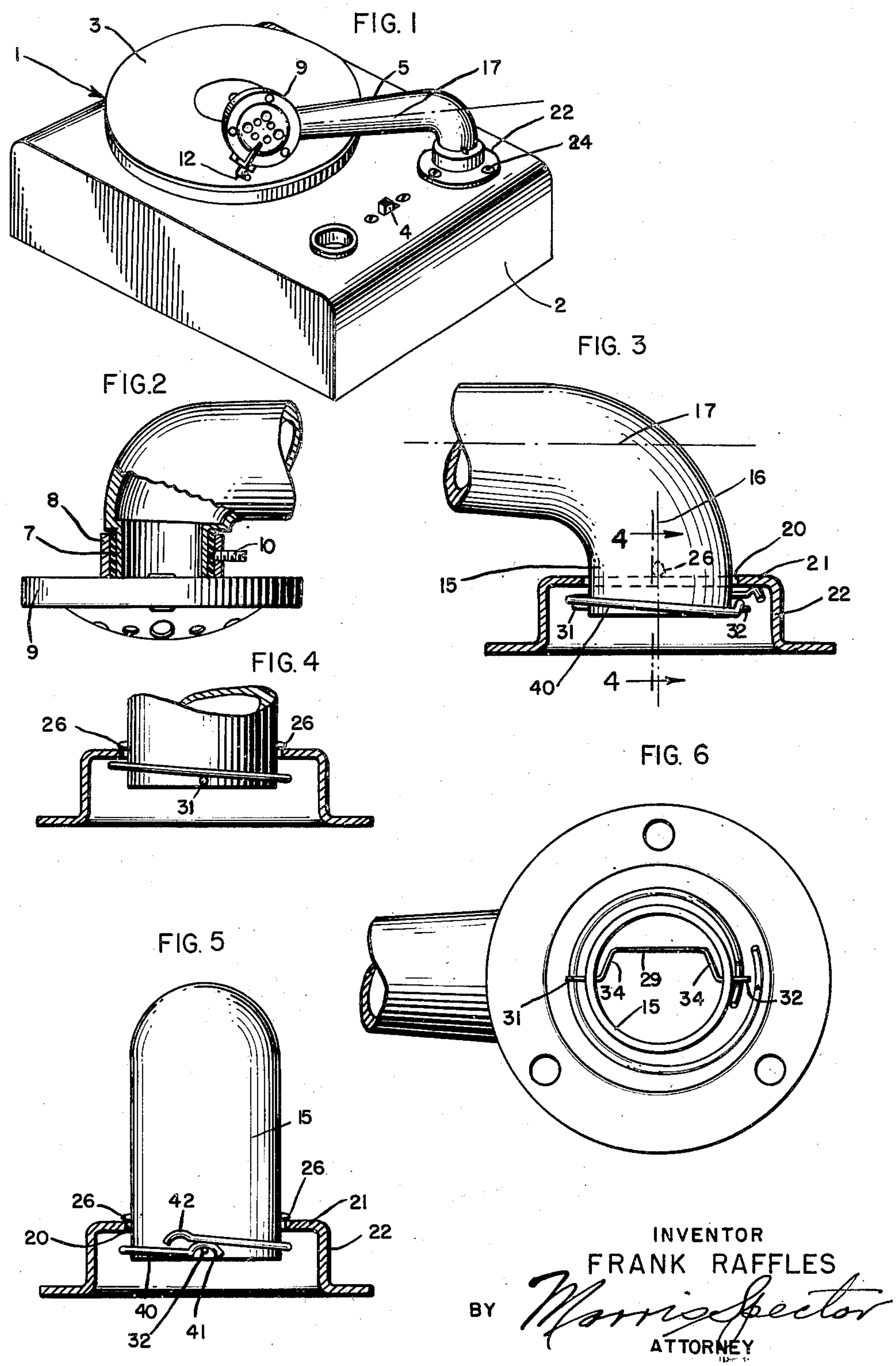
Figure 1 is a perspective view of one conventional type of phonograph on which a tone arm has been mounted in accordance with the principles of the present invention.
Figure 2 is a fragmentary sectional view showing the manner of mounting the sound pick-up on the end of the phonograph tone arm.
Figure 3 is a fragmentary sectional view showing the manner of mounting the tone arm in place.
Figure 4 is a fragmentary sectional view taken along the line 4—4 of Figure 3.
Figure 5 is a right hand end view of Figure 3 with the escutcheon plate shown in section.
Figure 6 is a bottom view of Figure 3.

In the drawing there is shown at 1 a conventional type of phonograph comprising, in this instance, a casing 2 which houses the usual electric motor than turns a phonograph record-receiving turntable 3 and which is controlled by an electric switch 4. A tone arm 5 is mounted on the casing 2 in accordance with the principles of the present invention to be presently more fully described. The tone arm, in this instance, comprises a tapered hollow tubular body having at its forward end an open cylindrical extension 7 over which is slipped a tubular projection 8 of a sound pick-up device 9, which projection is a rigid part of the sound pick-up device 9. The projection 8 is secured to the extension 7 in any desired manner as, for instance, by a set screw 10. An adjustably held needle or stylus 12, which is part of the sound pick-up device, is adapted to follow a groove in the phonograph record on the turntable 3 in the usual manner.

The tone arm 5 must be mounted so that the needle 12 is free to move with the tone arm in a direction towards and from the center of the turntable 3, and the tone arm is also so arranged that it can move up and down as necessitated by the needle following a groove in a record which is slightly worn, all as well known in the art. The phonograph tone arm 5 has a mounting end 15 the center axis 16 of which is at right angles to the longitudinal axis 17 of the rest of the tone arm. The lower part of the mounting end 15 extends through a much oversized circular opening 20 in a top plate 21 of an escutcheon 22 that is secured to the top of the casing 2 in any desired manner as, for instance, by a series of screws 24. The top and bottom surfaces of the plate 21 of the escutcheon are, preferably, flat planar surfaces. Short rounded nibs are cast integral with and extend from the mounting end 15 of the tone arm and constitute a pair of trunnions 26—26 that rest on the top surface of the plate 21 and serve to support the tone arm and prevent it from dropping further through the opening 20. Below the trunnions 26—26 the end 15 of the tone arm has a pair of aligned wire-receiving openings which are at right angles to the longitudinal axis of the trunnions 26—26. A wire 29 is passed through these openings and extends through the tone arm, forming short projections 31—32. These projections serve to prevent retraction of the tone arm from the opening 20, and the projection 32 also constitutes a seat for a counterbalancing spring to be more fully described. The portion of the wire 29 within the end 15 of the tone arm is bent, as indicated at 34—34, so that the wire 29 is not likely to be accidentally displaced from the end of the tone arm.

A counterbalancing spring is provided for reducing the amount of pressure of the needle 12 on the record. This spring consists of a round wire 40 coiled to form approximately one complete turn. The two ends of the wire 40 are bent, as indicated at 41 and 42, to provide at 41 means for seating the wire spring on the end 32 of the wire 29. The opposite curved end 32 of the wire spring 40 bears against the under surface of the plate 21. Due to its smooth rounded curvature, the wire at 42 provides substantially a point contact against the under side of the plate 21. As the tone arm turns about the axis 16, resulting from the movement of the stylus 12 towards or from the center of the turntable 3, the spring 40 moves with the tone arm, and the curved portion 42 thereof slides along the under surface of the plate 21. Friction losses due to this sliding movement are reduced by providing a thin layer of lubricating grease on the under side of the plate 21 along the portion thereof contacted by the top of the curved part 42 of the spring 40. It is to be noted that the top of the curved portion 42 of the spring 40 tapers downwardly in all directions from the point of contact between the portion 42 and the bottom surface of the plate 21. As a result, any turning movement of the tone arm about the axis 16, and corresponding sliding of the portion 42 on the under surface of the plate 21, results in the trapping of a wedge-shaped film of lubricant between the contacting point of the curved portion 42 of the spring and the under surface of the plate 21. This assures proper lubrication between the spring and the under surface of the plate 21. It is also to be noted, as may be seen more particularly from Figure 3, that the spring 40 in no way interferes with the freedom of the tone arm to swing about the trunnions 26—26 to allow for proper up and down movement of the stylus carrying part of the tone arm.

One end of the spring 40 is at a greater distance from the center of the tone arm than is the other end. In other words, there is a spiral effect in the spring in addition to the helical effect so that the end 42 of the spring is above the end 41 thereof and at a greater distance from the center of the spring than is the end 41. As a result of this arrangement, upon downward tilting of the tone arm the end at 41 of the spring can rise to a height almost touching the bottom of the plate 21. This permits the use of a spring of smaller pitch than would otherwise be necessary and as a result does not require heightening of the escutcheon 22.

While I have shown the wire 29 as one specific means for anchoring one end of the spring 40, it is apparent that the wire 29 may be omitted and the end 41 of the spring may be secured to the end 15 of the tone arm in any other desired manner, especially so in view of the fact that there is no appreciable sliding movement between the end 41 of the spring and the end 15 of the tone arm. That being the case it is possible, by way of example, to omit the wire 29 and pass the end 41 of the spring wire through the hole through which the end 32 of the former wire 29 passed, thus anchoring the end of the spring to the tone arm. Thus the hole in the tone arm, adjacent the wire 32, replaces the wire 32 as a spring anchoring means. The end 31 of the wire 29 may then, by way of example, be replaced by an adjustable screw which would thus serve to prevent withdrawal of the tone arm through the opening 12.

In accordance with the principles of the present invention the tension of the spring 40 may be adjusted within wide limits by flexing beyond its elastic limit when the same is disassembled from the tone arm. Thus the spring can be adjusted so that it will counterbalance almost all of the weight of the tone arm and of the sound pick-up 9 at the end of the tone arm. As a result the pressure of the needle on the phonograph record can be reduced to a minimum. This not only reduces the scratch noises that might be produced by the action of the needle on the record, but also reduces the wear on the record and reduces the amount of force required to turn the phonograph record. This is of particular importance in the case of phonographs that are driven by spring motors which generally have very little power and which might not otherwise be adequate for turning a phonograph record of a type now prevalent, and which has a high coefficient of friction with respect to a needle. By the present invention the total pressure between the needle and the record disc is so substantially reduced that a higher coefficient of friction can be tolerated without objectionable results.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A phonograph tone arm having means at one end for receiving a sound pick-up device and the opposite end constituting the mounting end extending at right angles to the rest of the arm, a mounting plate through which the mounting end extends, means for supporting the mounting end of the tone arm on said plate for swinging about a horizontal axis, and a counterbalancing spring embracing the mounting end of the tone arm below said pivot means, one end of the spring exerting its force against the tone arm and the opposite end being adapted to bear against the mounting plate.

2. A phonograph tone arm having means at one end for receiving a sound pick-up device and the opposite end constituting the mounting end extending at right angles to the rest of the arm, a mounting plate through which the mounting end extends, means for supporting the mounting end of the tone arm on said plate for swinging about a horizontal axis, and a counterbalancing spring embracing the mounting end of the tone arm below said pivot means, one end of the spring exerting its force against the tone arm and the opposite end being adapted to bear against the mounting plate, said opposite end of the spring having a smooth bend presenting a convex surface towards the structure against which it bears.

3. A phonograph tone arm comprising a tubular member having a mounting end which is an integral part thereof, the mounting end having a central axis at substantially a right angle to the longitudinal axis of the rest of the arm, a pair of trunnions extending from the mounting end at right angles to the central axis of the mounting end and also at right angles to the longitudinal axis of the rest of the arm, spring-receiving means at the mounting end of the tone arm and 90° displaced from the trunnions, and a counterbalancing spring surrounding the bottom of said mounting end and bearing against the spring receiving means at one end and free at the other end for bearing against a part of the structure on which the tone arm is to be mounted, said spring urging said mounting end to turn in one direction about said trunnions.

4. Apparatus comprising a hollow tone arm for a phonograph, one end of the arm being adapted to receive a sound pick-up device and the other end comprising the mounting end, said mounting end terminating in a tubular portion at a substantial angle to the rest of the tone arm, a mounting plate having a hole therethrough, the mounting end extending downwardly through the hole, the hole being oversized with respect to the mounting end of the tone arm to permit rocking of the longitudinal axis of the mounting end in the hole, supporting means extending from the mounting end and supporting the tone arm on the plate, means for preventing retraction of the tone arm from the plate comprising a wire extending through the mounting end of the tone arm below the plate and at right angles to said supporting means and projecting outwardly of the tone arm, and a counterbalancing spring surrounding the end of the tone arm below the plate and having one end bearing against the last mentioned wire and the opposite end sliding against the under surface of the plate.

5. Apparatus comprising a tone arm for a phonograph, one end of the arm being adapted to receive a sound pick-up device and the opposite end comprising the mounting end, said mounting end terminating in a mounting portion at a substantial angle to and rigid with respect to the rest of the tone arm, a mounting plate having a hole therethrough, the mounting end extending downwardly through said hole, projecting means extending from the mounting portion and resting on the top of said plate and limiting the distance which the mounting portion can extend into the hole, the mounting portion being axially rotatable in said hole and said projecting means being slidable along the plate around said hole as the mounting portion is axially rotated, said mounting portion having a limited freedom for rocking in said hole about the projecting means as trunnions around an axis at right angles to the longitudinal axis of the mounting portion, and a counterbalancing spring urging the mounting portion in its rocking motion in a direction opposite that in which it is urged by gravity, one end of the spring bearing on the mounting end of the tone arm and the other end exerting its pressure towards the mounting plate and being free to move with respect to the mounting plate as the mounting portion rotates axially.

6. Apparatus comprising a tone arm for a phonograph, one end of the arm being adapted to receive a sound pick-up device and the opposite end comprising the mounting end, said mounting end terminating in a mounting portion at a substantial angle to and rigid with respect to the rest of the tone arm, a mounting plate having a hole therethrough, the mounting end extending downwardly through said hole, projecting means extending from the mounting portion and resting on the top of said plate and limiting the distance which the mounting portion can extend into the hole, the mounting portion being axially rotatable in said hole and said projecting means being slidable along the plate around said hole as the mounting portion is axially rotated, said mounting portion having a limited freedom for rocking in said hole about the projecting means as trunnions around an axis at right angles to the longitudinal axis of the mounting portion, and a counterbalancing spring urging the mounting portion in its rocking motion in a direction opposite that in which it is urged by gravity, said spring surrounding said mounting portion on the under side of the mounting plate, and means for causing one end of the spring to bear on the mounting portion of the tone arm, the opposite end of the spring being slidable along and bearing against the underside of the mounting plate.

7. Apparatus comprising a tone arm for a phonograph, one end of the arm being adapted to receive a sound pick-up device and the opposite end comprising the mounting end, said tone arm being a hollow body of a cross section progressively increasing from the sound pick-up end to the mounting end, said mounting end terminating in a mounting portion at a substantial angle to and rigid with respect to the rest of the tone arm, the mounting end merging with the rest of the tone arm along smooth curves free of sharp corners, and the interior of the hollow tone arm constituting a sound passageway, a mounting plate having a hole therethrough, the mounting end extending downwardly through said hole, projecting means extending from the mounting portion and resting on the top of said plate and limiting the distance which the mounting portion can extend into the hole, the mounting portion being axially rotatable in said hole and said projecting means being slidable along the plate around said hole as the mounting portion is axially rotated, said mounting portion having a limited freedom for rocking in said hole about the projecting means as trunnions around an axis at right angles to the longitudinal axis of the mounting portion, and a counterbalancing spring urging the mounting portion in its rocking motion in a direction opposite that in which it is urged by gravity, said spring surrounding said mounting portion on the under side of the mounting plate, and means for causing one end of the spring to bear on the mounting portion of the tone arm, said last means projecting outwardly from the mounting end of the tone arm and constituting a bearing for the lower end of the spring, the upper end of the spring having a smooth bend providing a convex surface slidable along and bearing against the under side of the mounting plate.

FRANK RAFFLES.

(References on following page)

REFERENCES CITED

The following references are of record in the file of this patent:

UNITED STATES PATENTS

| Number | Name | Date |
|---|---|---|
| 962,565 | Gerson | June 28, 1910 |
| 1,139,224 | Pumphrey | May 11, 1915 |
| 1,371,635 | Mason | Mar. 15, 1921 |
| 1,996,511 | Harrison | Apr. 2, 1935 |
| 2,236,599 | Hutter | Apr. 1, 1941 |
| 2,331,122 | Jones | Oct. 5, 1943 |
| 2,351,948 | Gay | June 20, 1944 |

FOREIGN PATENTS

| Number | Country | Date |
|---|---|---|
| 328,222 | Great Britain | Apr. 22, 1930 |